M. THIBAULT & M. SAMWOLD.
AIR ENGINE PLANT.
APPLICATION FILED SEPT. 26, 1910.

1,002,943.

Patented Sept. 12, 1911.

4 SHEETS—SHEET 3.

M. THIBAULT & M. SAMWOLD.
AIR ENGINE PLANT.
APPLICATION FILED SEPT. 26, 1910.

1,002,943.

Patented Sept. 12, 1911.
4 SHEETS—SHEET 4.

Witnesses.

Inventors,
Magloire Thibault
&
Michael Samwold
by
Atty.

UNITED STATES PATENT OFFICE.

MAGLOIRE THIBAULT AND MICHAEL SAMWOLD, OF OTTAWA, ONTARIO, CANADA; SAID SAMWOLD ASSIGNOR OF ONE-THIRD OF HIS RIGHT TO HENRI JULES MAY, OF OTTAWA, CANADA.

AIR-ENGINE PLANT.

1,002,943. Specification of Letters Patent. Patented Sept. 12, 1911.

Application filed September 26, 1910. Serial No. 583,933.

*To all whom it may concern:*

Be it known that we, MAGLOIRE THIBAULT, residing at 209 Murray street, in the city of Ottawa, in the county of Carleton, in the Province of Ontario, in the Dominion of Canada, carpenter, and MICHAEL SAMWOLD, residing at 37 McKenzie avenue, in the city of Ottawa, in the county of Carleton, in the Province of Ontario, in the Dominion of Canada, waiter, having invented certain new and useful Improvements in Air-Engine Plants, do hereby declare that the following is a full, clear, and exact description of the same.

The invention relates to improvements in air engine plants, as described in the present specification and illustrated in the accompanying drawings that form part of the same.

The invention consists essentially in the novel construction and arrangement of parts, whereby the air after utilization in the running of the engine, will be compressed and supplemented by air from the atmosphere and returned to the main tank.

The objects of the invention are to increase the efficiency of the air engine, to reduce the cost of compressing air for the engine, and generally to provide an air engine plant simple and economical to manufacture and cheap as regards maintenance.

Figure 1:
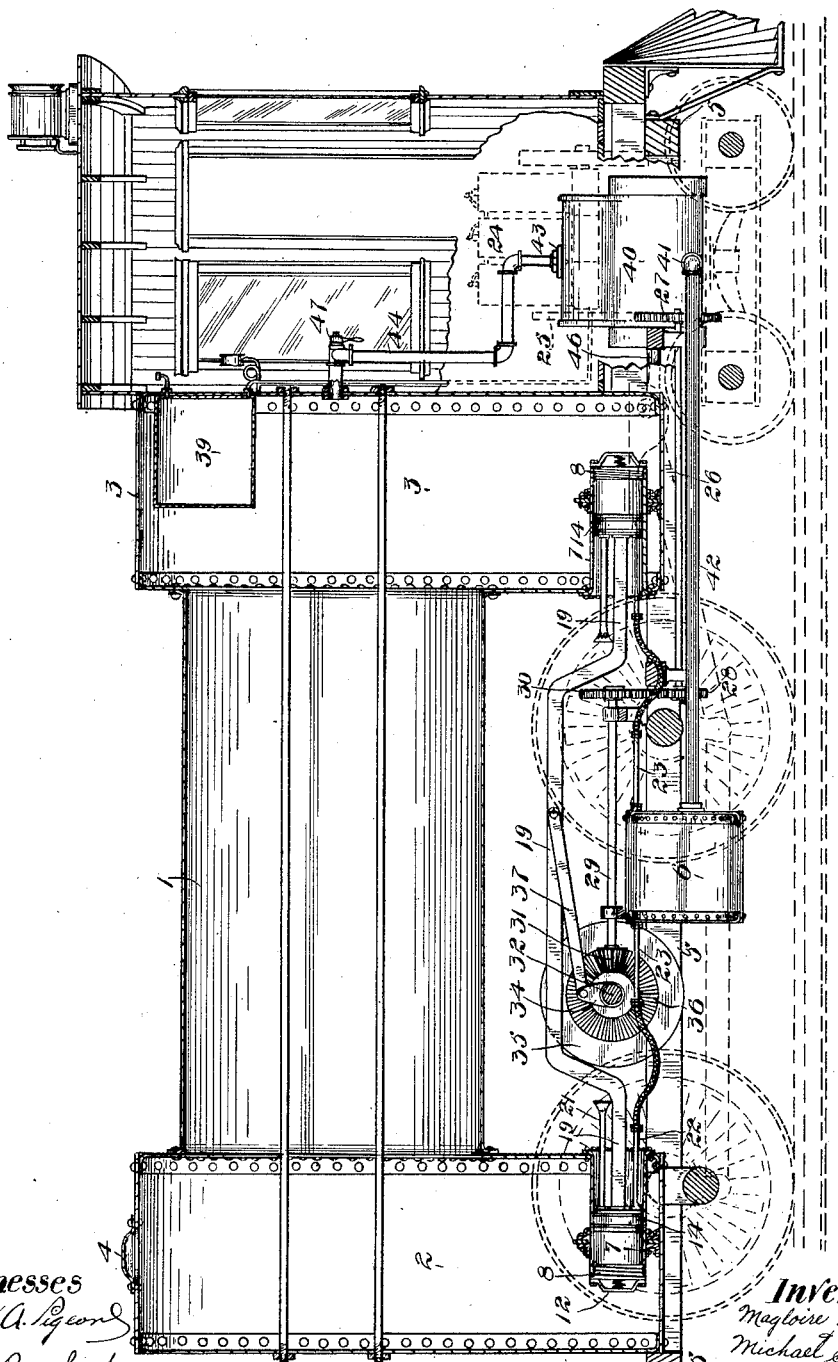
Figure 2:
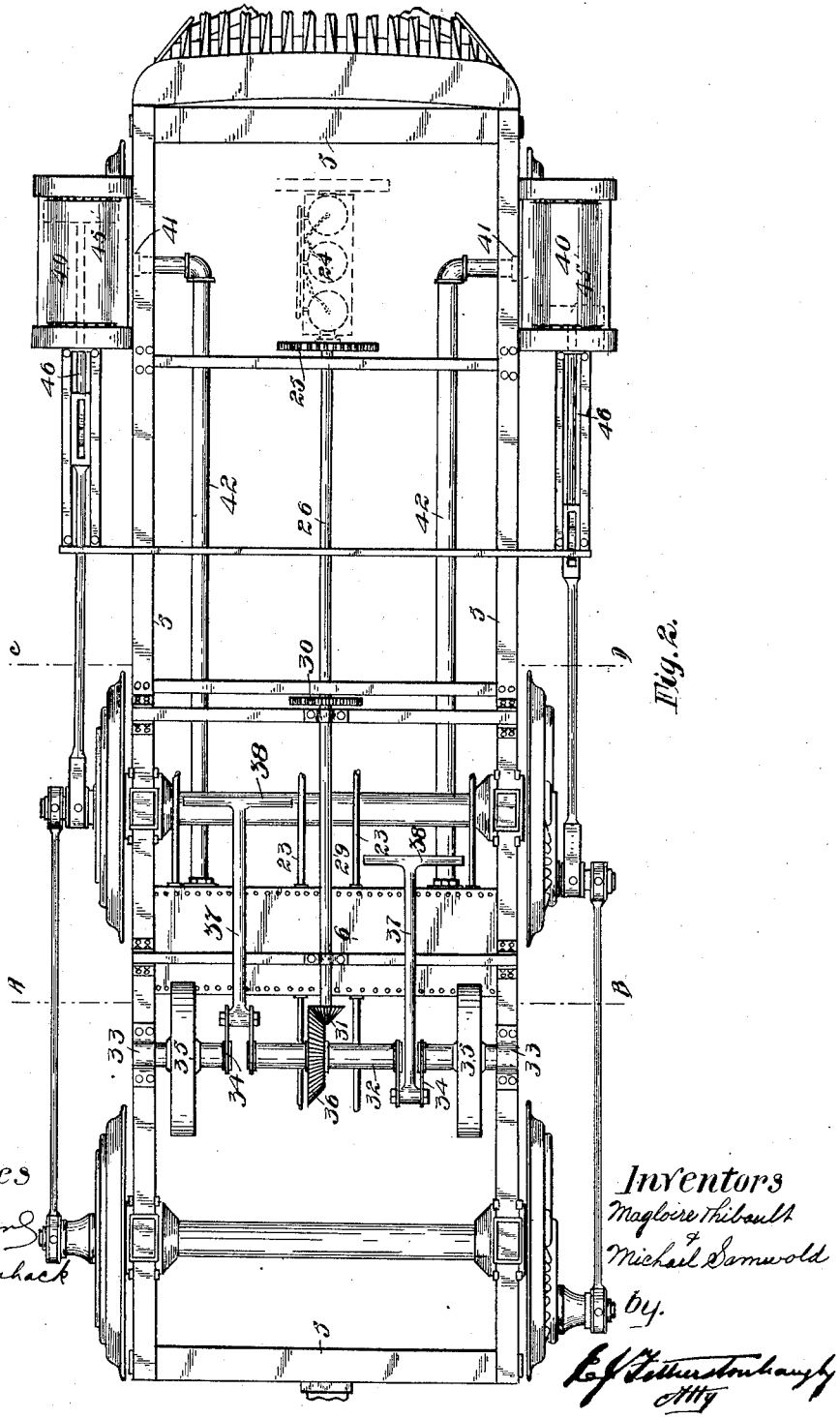
Figure 3:
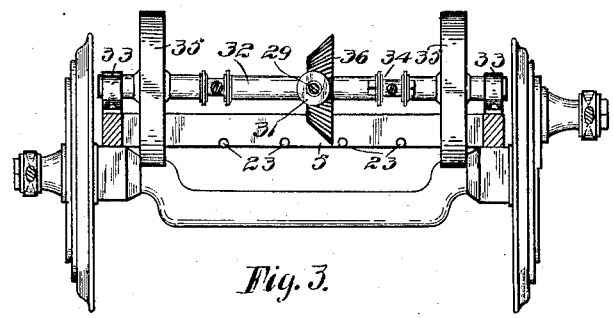
Figure 4:
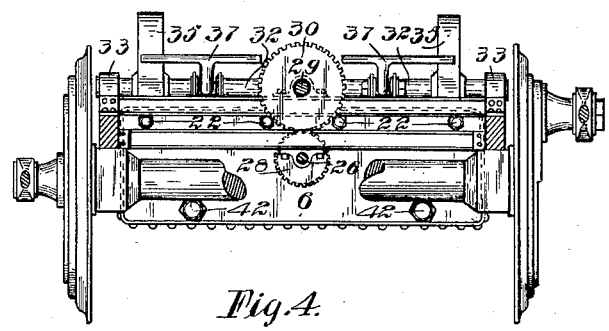
Figure 6:
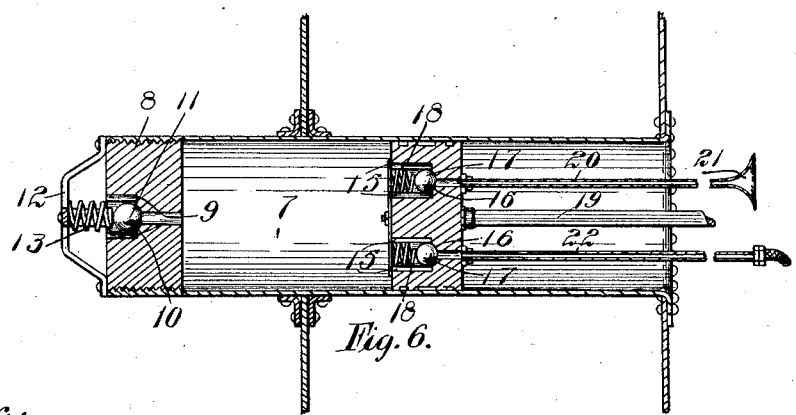
Figure 5:
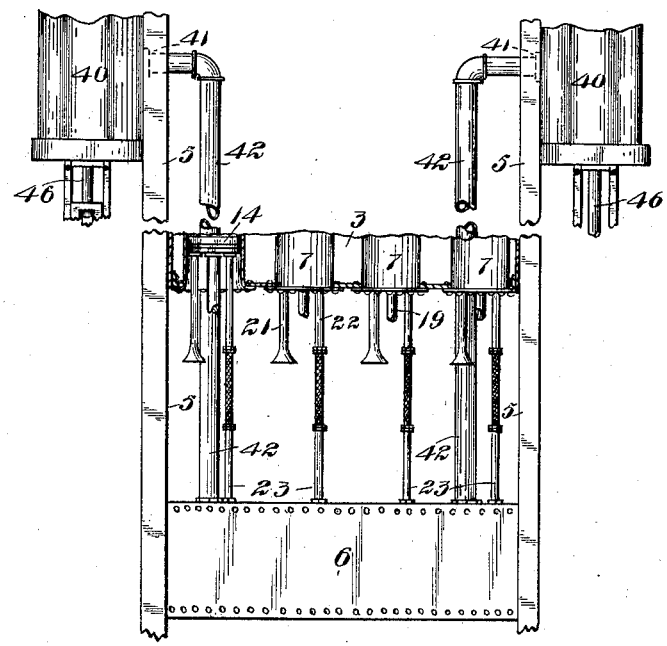
Figure 7:
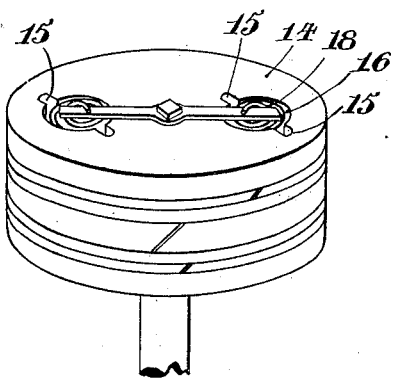

In the drawings, Figure 1 is a longitudinal and vertical mid-sectional view of the plant. Fig. 2 is a plan view showing the various operating connections with the upper portion of the plant removed. Fig. 3 is a cross sectional view on the line A—B in Fig. 2. Fig. 4 is a cross sectional view on the line C—D in Fig. 2. Fig. 5 is a horizontal sectional view of a portion of the apparatus showing various pipe connections. Fig. 6 is a longitudinal sectional detail of the compressor pump, cylinder and piston. Fig. 7 is a perspective detail of the pump piston enlarged.

Like numerals of reference indicate corresponding parts in each figure.

Referring to the drawings, 1 is the main air tank having the enlarged ends 2 and 3, and the man hole 4 suitably closed, the said enlarged ends extending above and below the central portion and the whole being supported on the frame 5, which is here shown as the frame of a locomotive, though it must be understood that this tank and the rest of the plant may be supported on any suitable frame and used for other purposes.

6 is the exhaust air tank supported from the frame 5 and extending thereacross beneath the central portion of the main tank 1.

7 is a pump cylinder here used as an air compressor having the head 8 through which is the air outlet 9, said air outlet extending through said head from the cup-shaped cavity 10 at the bottom of which a suitable valve seat is formed.

11 is a ball valve in the cavity 10, finding its seat in the bottom of said cavity.

12 is a bracket secured to the head 8 and extending thereacross over the cavity 10.

13 is a spring secured centrally to the bracket 12 and exerting pressure on the ball valve 11, thus regulating the pressure at which the air is released from the cylinder 7. The cylinder 7 is supported on the frame 5 centrally under the enlarged end 3 of the main tank.

14 is the piston having the air openings 15 therethrough leading from the bottom of the cavities 16.

17 are ball valves spring-held to the bottom of the cavities 16 by the springs 18.

19 is a piston rod extending from the piston 14 through the open end of the cylinder 7.

20 is an air receiver secured to an air opening 15 in the piston 14 and extending beyond the open end of the piston and having the bell mouth 21.

22 is a pipe connecting the other air opening 15 with the exhaust tank 6 and forming the means of communication between said exhaust tank and said cylinder 7, said pipe being here shown as a flexible tube of rubber or other suitable material, though it must be understood that it may be made in many other forms, one of said forms being a telescopic arrangement and another being a flexible joint connection. These are not illustrated or described herein, as it is obvious that one or another may be used, and for the purposes of the invention, it is not necessary to show more than one.

23 is an outlet pipe leading from the cylinder 7 to the enlarged end 3 of the main tank 1 and forming the means of communication between said cylinder 7 and said tank and the passage of compressed air into the main tank 1.

24 is an internal combustion engine here shown as operating four pumps, one of which has been described.

25 is a spur gear mounted on the engine shaft.

26 is a shaft journaled in bearings supported from the frame 5 and extending rearwardly in the plant at a comparatively low level. 27 is a spur gear mounted on the shaft 26 and coacting with the gear 25. 28 is a spur gear mounted at the other end of the shaft 26.

29 is a shaft journaled in suitable bearings supported from the frame 5 and extending longitudinally with the engine plant at a higher level than the shaft 26. 30 is a spur gear mounted on the shaft 29 and co-acting with the gear 28. 31 is a bevel pinion mounted on the other end of the shaft 29.

32 is a cross shaft journaled in the bearings 33 supported by the frame 5 and having the cranks 34 intermediate of the length thereof.

35 are fly wheels mounted on the shaft 33.

36 is a bevel gear wheel co-acting with the bevel pinion 31.

37 are connecting rods pivotally secured to the cranks 34 and having the cross heads 38 pivotally connected to the piston rods 19.

39 is a gasolene tank secured within the enlarged end 3 of the main tank and suitably connected with the internal combustion engine 24.

It will thus be seen that the engine 24 receiving its explosive mixture from the tank 39 will operate and in turn insure the operation of the several pumps as the gear connections from said engine to the shaft 32 will cause said shaft 32 to rotate and so revolve the cranks 34. These cranks being connected to the pistons 14, the latter are made to reciprocate in the cylinder 7 and by this means draw in and compress air and force it into the main tank.

40 are the air engine cylinders having the exhaust openings 41 connected by the pipes 42 to the exhaust air tank 6 and the inlets 43 connected by the pipes 44 to the main air tank 1.

45 are pistons operating in the cylinders 40.

46 are piston rods extending from the pistons 45 and here shown as connected to the driving wheels of the locomotive, though they may be connected to any other machine.

47 is a turn-cock in the connections from the main tank to the air engine cylinders.

In the operation of this plant, the main tank is first fully charged with compressed air and the air turned on into the cylinders 40 by operating the turn-cock 47. This part of the plant is common therefore needs no further comment. The exhaust from the cylinders 40 is driven through the connections into an exhaust air tank and from there it is sucked through the pistons 14 into the compressor ends of the pump cylinders 7. Coincidently with the suction of the air from the air tanks, air is drawn into the compressor chambers through the bell mouthed air receivers 20, so that the air in the main cylinder is being continuously augmented through the discharge in the various pumps, thus a maximum pressure may be kept up in said main tank during the operation of the air engine through the means of the pumps operated by the auxiliary engine 24.

The description of the operation, and in fact the explanation of the details has been much confined in this specification to the application of the invention to a locomotive and in such use the engine will be found extremely efficient, though it is obvious that it may be utilized for stationary plants.

It must be understood that various modifications may be made both in the construction and the arrangement of the various parts in this invention, without departing from the spirit of the invention, so long as the main features, as pointed out in the following claims for novelty, are adhered to.

What we claim as our invention is:

1. In an air engine plant, an air cylinder having inlet and exhaust openings and a piston operating therein, a main tank connected with said inlet, an exhaust air tank connected with said exhaust opening, an air compressor pump having a plurality of suction orifices through the piston thereof and valves controlling said orifices, a bell mouthed air receiver secured to said piston over one of said orifices, and connections from another orifice to said exhaust air tank.

2. In an air engine plant, an air cylinder having inlet and exhaust openings and a piston operating therein, a main tank suitably connected to said inlet opening, an exhaust air tank connected to said exhaust opening, an air compressor pump having a piston operating therein, said piston having cavities in the inner face thereof and suction channels or grooves in the walls of said cavities and air orifices from the beds of said cavities through the outer face, bridges formed over said cavities, ball valves within said cavities, springs arranged between said balls and said bridges securely holding said valves to their seats in the bottom of said cavities, a supplementary engine operatively connected to said pump, means connecting said pump to said exhaust air tank, and means connecting said pump to said main tank.

3. In a device of the class described, in combination, a frame, a crank shaft suitably supported and journaled in said frame, a plurality of connecting rods connecting said crank shaft with said pump pistons, connecting pipes from air orifices in said pump pistons to said exhaust air tank, bell mouth air receivers secured to said pump pistons at the other air openings, means connecting said pumps with said main air tank, and an internal combustion engine supported by said frame operatively connected with said crank shaft.

4. In a device of the class described, in combination, an air cylinder having inlet and exhaust openings, and a piston operating therein, a main air tank connected with said inlet opening, an exhaust air tank connected with said exhaust opening, an air compressor pump connected to said main tank and to said exhaust air tank, an internal combustion engine operating said pump, and an explosive mixture tank contained within said main air tank and having an outlet therefrom leading to said internal combustion engine.

5. In a device of the class described, in combination, a locomotive frame, a running gear supporting said frame, a pair of air cylinders supported at the front end of said frame and having inlet and exhaust openings and pistons operating therein, a main air tank having a central portion terminating in enlarged ends and connected to said inlet openings, a crank shaft journaled in said frame beneath the central portion of said air tank, a plurality of air compressor pumps having air orifices in the pistons thereof connected to said crank shaft and supported by said frame under the forward enlarged end of said cylinder and an internal combustion engine operatively connected to said crank shaft and supported by said frame at the front end thereof, an exhaust air tank supported by said frame connected to the exhaust openings of said air cylinder and to air orifices in the piston of said pumps, a plurality of bell mouth air receivers connected to other air orifices in said pump piston and connecting rods from the air cylinder pistons to the driving wheels of the running gear.

Signed at Ottawa, this 29th day of August 1910, in the presence of two witnesses.

MAGLOIRE THIBAULT.
MICHAEL SAMWOLD.

Witnesses:
RENE A. PIGEON,
M. MAHONEY.